US009578460B2

(12) United States Patent
Kitchen (10) Patent No.: US 9,578,460 B2
(45) Date of Patent: Feb. 21, 2017

(54) DETERMINING IF A TARGET DEVICE IS COLLOCATED WITH OTHER DEVICES IN A USER'S CONTACTS LIST USING MOVEMENT VECTORS

(71) Applicant: International Business Machines Corporation, Armonk, NY (US)

(72) Inventor: Ian P. Kitchen, Bishops Stortford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/042,230

(22) Filed: Feb. 12, 2016

(65) Prior Publication Data

US 2016/0165399 A1    Jun. 9, 2016

(51) Int. Cl.
*H04W 24/00* (2009.01)
*H04W 4/02* (2009.01)
*H04W 76/02* (2009.01)
*H04W 8/00* (2009.01)

(52) U.S. Cl.
CPC ........... *H04W 4/023* (2013.01); *H04W 8/005* (2013.01); *H04W 76/023* (2013.01)

(58) Field of Classification Search
None
See application file for complete search history.

(56) References Cited

U.S. PATENT DOCUMENTS

| 6,327,356 | B1 | 12/2001 | Malik |
| 7,289,814 | B2 | 10/2007 | Amir et al. |
| 8,081,992 | B2 | 12/2011 | Book |
| 8,160,615 | B1 | 4/2012 | Barnes et al. |
| 8,484,344 | B2 | 7/2013 | Butterfield et al. |
| 8,676,232 | B2 | 3/2014 | Bychkov et al. |
| 2009/0284412 | A1 | 11/2009 | Xiao et al. |
| 2012/0214449 | A1 | 8/2012 | Jordan et al. |
| 2013/0217364 | A1 | 8/2013 | Varoglu et al. |

OTHER PUBLICATIONS

Anonymous, "A method and system to automatically select mobile phone number based on user's location," IP.com, Nov. 15, 2013, p. 1-3, IP.com No. IPCOM000232554D, Available at: http://ip.com/IPCOM/000232554.

(Continued)

*Primary Examiner* — Martin Mushambo
(74) *Attorney, Agent, or Firm* — Reza Sarbakhsh (57) ABSTRACT

A method to determine whether a target device is collocated with at least one other device within a plurality of devices associated with a user's contact list is provided. The method may include determining location information for each of the plurality of mobile devices associated with the user's contact list. The method may also include selecting a target device within the plurality of devices. The method may further include determining, based on the location information, whether the selected target device is collocated with the at least one other device within the plurality of devices. Additionally, the method may include displaying the at least one other collocated device to the user. The method may also include determining if the at least one other collocated device is selected by the user. The method may include connecting the target device and the selected at least one other collocated device to the user's device.

20 Claims, 4 Drawing Sheets

(56) References Cited

OTHER PUBLICATIONS

Apple, "Find My Friends," App Store on iTunes, Updated: Nov. 19, 2013, Version: 3.0, App designed for both iPhone and iPad, https://itunes.apple.com/us/app/find-my-friends/id466122094?mt=8, Accessed on: Jun. 18, 2014.

Devaul et al., "The Context Aware Cell Phone Project," MIT Media Lab, 2001, p. 1-3, https://www.media.mit.edu/wearables/mithril/phone.html, Accessed on: Jun. 18, 2014.

Sasler et al., "Profile Scheduler which automatically changes IM Status," Maemo.org Talk, Sep. 29, 2009, p. 1-9, http://talk.maemo.org/printthread.php?t=32197&pp=40, Accessed on: Jun. 18, 2014.

Zeng, "Click to call in Google Maps," Official Google Blog, Nov. 16, 2006, p. 1-3, http://googleblog.blogspot.com/2006/11/click-to-call-in-google-maps.html, Accessed on: Jun. 18, 2014.

Pending U.S. Appl. No. 14/311,846, filed Jun. 23, 2014, entitled: "Determining if a Target Device is Collocated With Other Devices in a User's Contacts List", 24 pages.

Disclosed Anonymously, "Improved Method for Determining a Person's Communication-Status", IP.com: IPCOM000236876D, May 20, 2014, 3 pages.

FIG. 1

Server 112

FIG. 4

DETERMINING IF A TARGET DEVICE IS COLLOCATED WITH OTHER DEVICES IN A USER'S CONTACTS LIST USING MOVEMENT VECTORS

FIELD OF THE INVENTION

The present invention relates generally to the field of computing, and more particularly to mobile communication.

BACKGROUND

Mobile devices have become a primary source of communication. Many people carry their mobile devices with them throughout the day and use them to contact other people via the other person's mobile device. However, often, people may not be aware of whether any of their other contacts are located near the intended recipient of a call.

SUMMARY

According to one embodiment, a method to determine whether a target device is collocated with at least one other device within a plurality of devices associated with a user's contact list stored on the user's device is provided. The method may include determining location information for each of the plurality of mobile devices associated with the user's contact list. The method may also include selecting a target device within the plurality of devices associated with the user's contact list. The method may also include determining, based on the location information, whether the selected target device is collocated with the at least one other device within the plurality of devices associated with the user's contact list. The method may further include displaying the at least one other collocated device to the user. Additionally, the method may include determining if the at least one other collocated device is selected by the user. The method may also include connecting the target device and the selected at least one other collocated device to the user's device based on the determining indicating that the at least one other collocated device is selected.

According to another embodiment, a computer system to determine whether a target device is collocated with at least one other device within a plurality of devices associated with a user's contact list stored on the user's device is provided. The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method. The method may include determining location information for each of the plurality of mobile devices associated with the user's contact list. The method may also include selecting a target device within the plurality of devices associated with the user's contact list. The method may also include determining, based on the location information, whether the selected target device is collocated with the at least one other device within the plurality of devices associated with the user's contact list. The method may further include displaying the at least one other collocated device to the user. Additionally, the method may include determining if the at least one other collocated device is selected by the user. The method may also include connecting the target device and the selected at least one other collocated device to the user's device based on the determining indicating that the at least one other collocated device is selected.

According to yet another embodiment, a computer program product to determine whether a target device is collocated with at least one other device within a plurality of devices associated with a user's contact list stored on the user's device is provided. The computer program product may include one or more computer-readable tangible storage medium and program instructions stored on at least one of the one or more tangible storage medium, the program instructions executable by a processor. The computer program product may include program instructions to determine location information for each of the plurality of mobile devices associated with the user's contact list. The computer program product may also include program instructions to select a target device within the plurality of devices associated with the user's contact list. The computer program product may also include program instructions to determine, based on the location information, whether the selected target device is collocated with the at least one other device within the plurality of devices associated with the user's contact list. The computer program product may further include program instructions to display the at least one other collocated device to the user. Additionally, the computer program product may include program instructions to determine if the at least one other collocated device is selected by the user. The computer program product may also include program instructions to connect the target device and the selected at least one other collocated device to the user's device based on the determining indicating that the at least one other collocated device is selected.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate to the field of computing, and more particularly to mobile communication. The following described exemplary embodiments provide a system, method, and program product to, among other things, determine whether a target device is collocated with other devices in a user's contact list.

As previously described, mobile devices have become a primary source of communication. However, a caller often may not be aware if any of the people associated with the contacts stored in the caller's contact list are in the same location as the intended recipient of the call.

As such, the caller may not be able to communicate necessary information to multiple contacts listed in the caller's contact list who may be in the same location as the callee, simply because the caller is not aware of the location of people in the caller's contact list. Furthermore, the caller may even decide not to place a call as the presence of a particular contact with the callee causes them to decide the callee would not be free to talk. As such, it may be advantageous, among other things, to provide a mechanism to determine the locations of the people associated with the contacts in the address book of the caller's device. Additionally, it may be advantageous for a callee to be able to see who is present with the caller when the callee receives a call from the caller.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to, among other things, determine whether a target device (i.e., a callee's device) is collocated with at least one other device that is associated with one or more entries in a user's contact list. As previously described, the present embodiment may provide a mechanism to determine whether contacts in the address book of the caller's device are collocated.

According to at least one implementation, a first device may send a command to discover the locations of the contacts stored in the address book of the first device. The first device may then display the contacts that are in the same location as the intended recipient of the call. As such, the present embodiment may provide an effective means for a caller to know if the callee may be free to have a discussion with one of the caller's other contacts. Therefore, it may be beneficial for the caller to know if any of the caller's other contacts may be present with the callee in order to have a conversation in which the callee may confer with the other person (i.e., another contact) present with them.

Additionally, according to the present embodiment, the collocated device may be patched into a conversation between the caller (using a first device) and the callee (using a target device) by utilizing existing short range communication technologies, such as Bluetooth or Wi-Fi communication. As such, the present embodiment may save on calling charges and additionally, may allow a multi-way conversation without the necessity of a speaker phone.

Furthermore, according to at least one implementation, a first device (i.e., the caller's device or user's device) may send a query to a coordinating server listing the phone numbers obtained from the contact list stored in the address book of the first device. Then, the server may return information determining which devices are collocated. Next, the collocated information may be then be displayed on the screen of the first device adjacent to each number listed in the contacts list stored on the first device. Furthermore, the displayed list may be updated during the call if the people who are collocated change. The collocated information may be displayed based on a predetermined radius. For example, the displayed list may apply to collocated contacts that are each within 0.25 miles of each other. The selected radius may mitigate the probability that another contact (i.e., person) will unexpectedly appear mid-conversation (i.e., voice) or communication (i.e., text). For instance, a contact outside the 0.25 mile radius is less likely to appear during a presently initiated communication between the user and one of their contacts.

Figure 1:
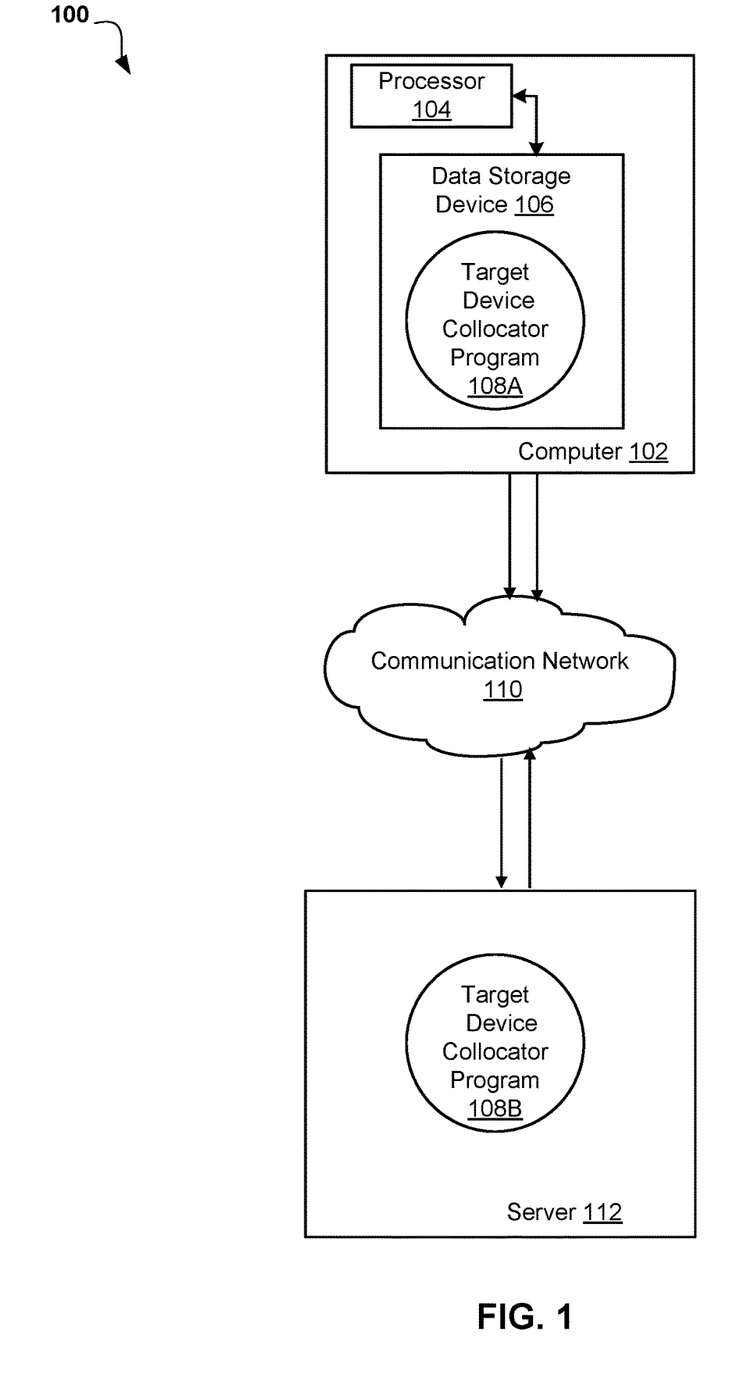
FIG. 1 illustrates a networked computer environment according to one embodiment.

Referring now to FIG. 1, an exemplary networked computer environment 100 in accordance with one embodiment is depicted. The networked computer environment 100 may include a computer 102 with a processor 104 and a data storage device 106 that is enabled to run a Target Device Collocator Program 108A. The networked computer environment 100 may also include a server 112 that is enabled to run a Target Device Collocator Program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a cellular network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively and client computer 102 may include internal components 800b and external components 900b, respectively. Client computer 102 may be, for example, a device, a telephone, a personal digital assistant, a netbook, a laptop computer, a tablet computer, a desktop computer, or any type of computing device capable of running a program and accessing a network.

A program, such as a Target Device Collocator Program 108A and 108B may run on the client computer 102 or on the server computer 112. The Target Device Collocator Program 108A, 108B may determine if a target device is collocated with other devices in a user's contacts list stored on the user's device. The Target Device Collocator method is explained in further detail below with respect to FIG. 3.

Figure 2:
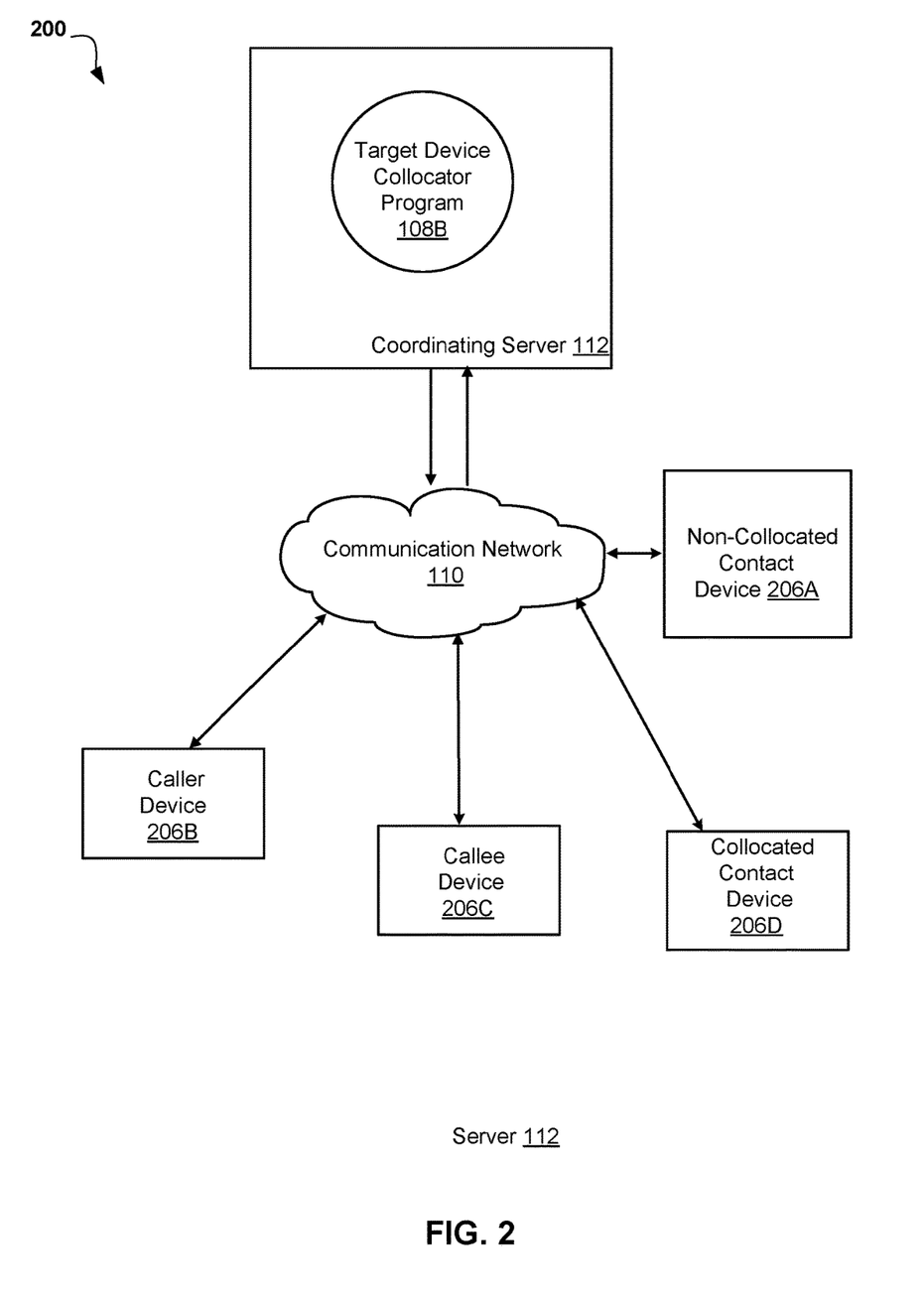
FIG. 2 illustrates a networked computer environment including multiple devices according to one embodiment.

Referring now to FIG. 2, an exemplary networked computer environment 200 including multiple devices in accordance with one embodiment is depicted. According to one implementation a user using a first device (i.e. the user's device), such as Caller Device 206B may call a target device, such as Callee Device 206C. Additionally, the first device, such as Caller Device 206B, may send a query via a communication network 110, such as a cellular network (e.g., communication network 110) to a Coordinating Server 112 requesting a list of the phone numbers in the user's contact list stored on the first device 206B associated with people whose device is collocated near the Callee Device 206C (i.e., the target device). The Coordinating Server 112 may return information pertaining to which devices (e.g., Collocated Contact Device 206D) belonging to the people in the user's contact list who may be collocated near the callee. Such information may be displayed on the screen of the first device 206B by displaying the phone number of the contact person's name adjacent to the contact information of the people whose devices are collocated. According to one implementation, information pertaining to collocated devices may be displayed; however, information pertaining to a non-collocated device, such as Non-Collocated Contact Device 206A, may not be displayed.

As previously explained, this may allow the caller (i.e., the user using the first device 206B) to invite other callers who are collocated with the callee who is using the target device (i.e., Callee Device 206C) to join the call using short range communication technologies, such as Bluetooth or WI-FI. Additionally, once the initial call has been placed, the present embodiment may update the displayed list of collocated users as they are no longer are present or collocated near the callee during the time of the call.

Figure 3:
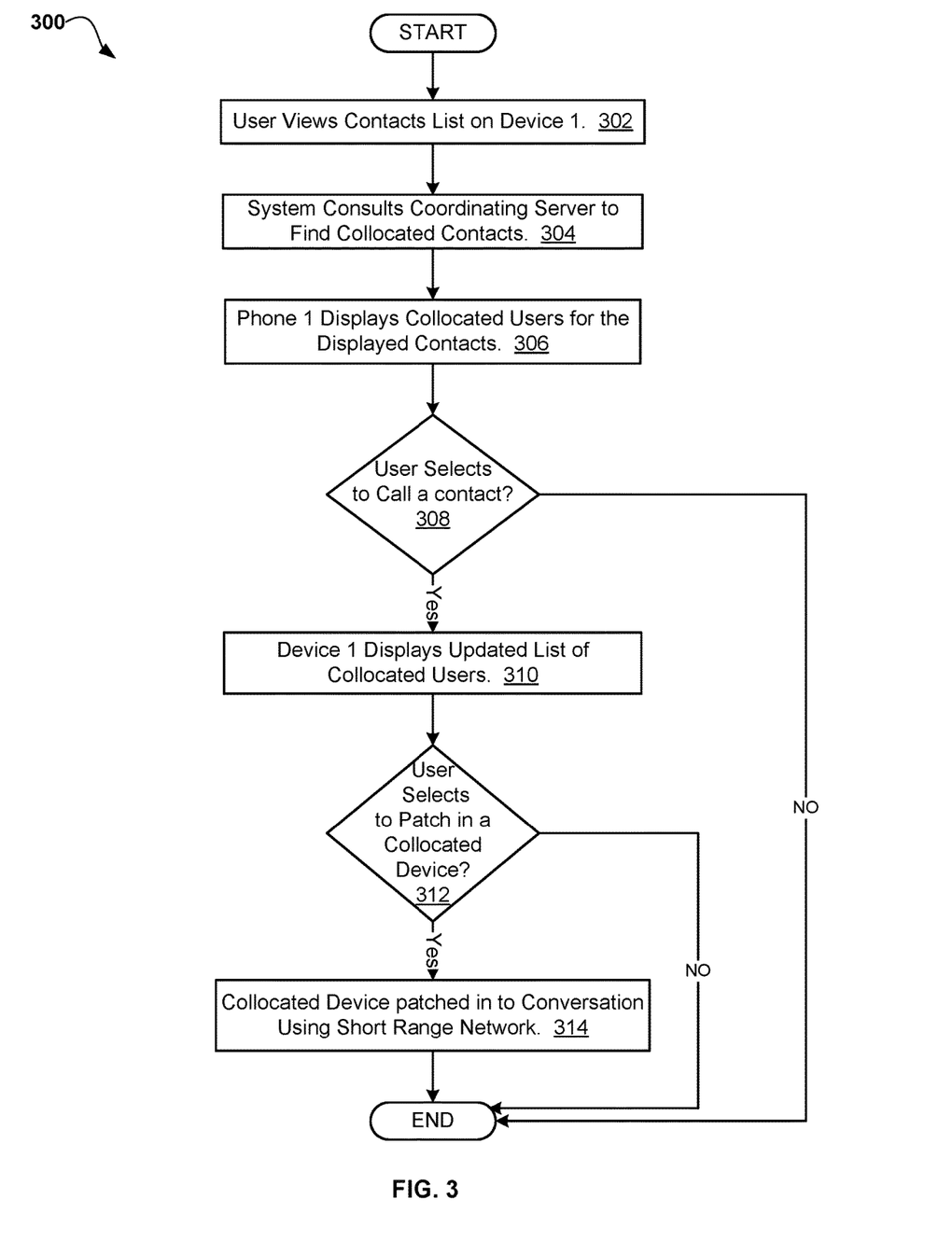
FIG. 3 is an operational flowchart illustrating the steps carried out by a program to determine if a target device is collocated with other devices in a user's contact list according to one embodiment.

Referring now to FIG. 3, an operational flowchart 300 illustrating the steps carried out by a program to determine if a target device is collocated with other devices in a user's contact list in accordance with one embodiment is depicted. For example, the Target Device Collocator Program 108A, 108B (FIG. 1) may be implemented as running on a client computer 102 (FIG. 1) or server computer 112 (FIG. 1). Alternatively, in some implementations, the Target Device Collocator Program 108A, 108B (FIG. 1) may run in a distributed manner on both the client computer 102 (FIG. 1) and the server computer 112 (FIG. 1). As previously described, a user using client computer 102 (FIG. 1) may execute the Target Device Collocator Program 108A, 108B (FIG. 1) to determine if a target device is collocated with other devices in a user's contacts list.

With respect to FIG. 3 at 302, a caller (i.e., a user) may view their contact list on a first device (i.e., a caller's or user's device 206B (FIG. 2)). Then at 304, the first device 206B (FIG. 2) may consult a coordinating server 112 (FIG. 2) to find collocated contacts. As such, the first device 206B (FIG. 2) may send a query to a coordinating server 112 (FIG. 2) requesting a list of phone numbers and the collocated devices associated with people who are listed as contacts on the user's device (i.e., the first device 206B (FIG. 2)). The coordinating server 112 (FIG. 2) may build an updatable table of Global Positioning System (GPS) data for the entries in the user's contact list. Based on this GPS data, it may be determined whether one or more groups of contacts within the user's contact list are collocated. It may be appreciated that other exemplary location finding techniques (e.g., cellular) may be employed to ascertain the location of the user's contacts.

According to at least one implementation, the mechanism for determining collocation may be based on the two locations of the contacts being within a distance threshold. The threshold may be changed by the user; however, the system may have the capability to accurately locate contacts in different areas such that it would may be shorter in areas where the location could be determined more accurately and greater in areas where the location is harder to determine accurately. The present embodiment may also take into account how recently a location was identified. Another implementation may also detect if the two parties are moving together by comparing their movement vectors, such that two contacts in a moving train may be judged as being collocated but two contacts in vehicles moving in the opposite direction may not be determined as being collocated at the instant that they pass each other. The present embodiment; therefore, allows a user to be made aware of collocation at the point of initiating communication with the party (e.g. placing or receiving a voice call or sending and receiving a message) only when two contacts are determined to be collocated by the system.

Next at 306, the first device 206B (FIG. 2) displays the collocated users for the displayed contacts. As such, according to one implementation, the coordinating server 112 (FIG. 2) may return information to the caller displaying the phone numbers and locations of the devices associated with collocated people who are listed as contacts on the user's device (i.e., the first device 206B (FIG. 2))

Then at 308, it is determined whether the user selects to call a contact. As such, the user may select to call a contact from the user's contact list. If at 308, it is determined that the user does not select to call a contact, then the method may end. However, if at 308, it is determined that the user does select to call a contact (i.e., a target device or a callee device 206C (FIG. 2)), then the method continues to step 310.

Next at 310, the first device (206B FIG. 2) displays an updated list of collocated users. Therefore the first device 206B (FIG. 2) may display an updated list of collocated users based on the location of the selected contact 206C (FIG. 2).

Then at 312, it is determined whether the user selects to patch in (i.e., connect) a collocated device 206D (FIG. 2). If at 312 it is determined that the user does not select to patch in a collocated device 206D (FIG. 2), then the method may end. However, if at 312 it is determined that the user does select to patch in a collocated device 206D (FIG. 2), then the method continues to step 314.

Next at 314, the selected collocated phone 206D (FIG. 2) is patched in to the conversation using between the first device 206B (FIG. 2) and the target device (i.e., the callee device 206C (FIG. 2)) using short range network technology, such as Bluetooth or Wi-Fi. Therefore, the selected collocated device 206D (FIG. 2) may be connected to the first device 206B (FIG. 2) and the callee device 206C (FIG. 2).

It may be appreciated that FIG. 3 provides only an illustration of one implementation and does not imply any limitations with regard to how different embodiments may be implemented. Many modifications to the depicted environments may be made based on design and implementation requirements. For example, the present embodiment may be implemented so that a callee may see who is present with the caller when the callee receives a call from the caller. Additionally, the present embodiment may be implemented with instant messaging, direct messaging on social websites, and direct messaging on email communication as long as the device and instant messaging, direct messaging or email identity may be tied together.

Figure 4:
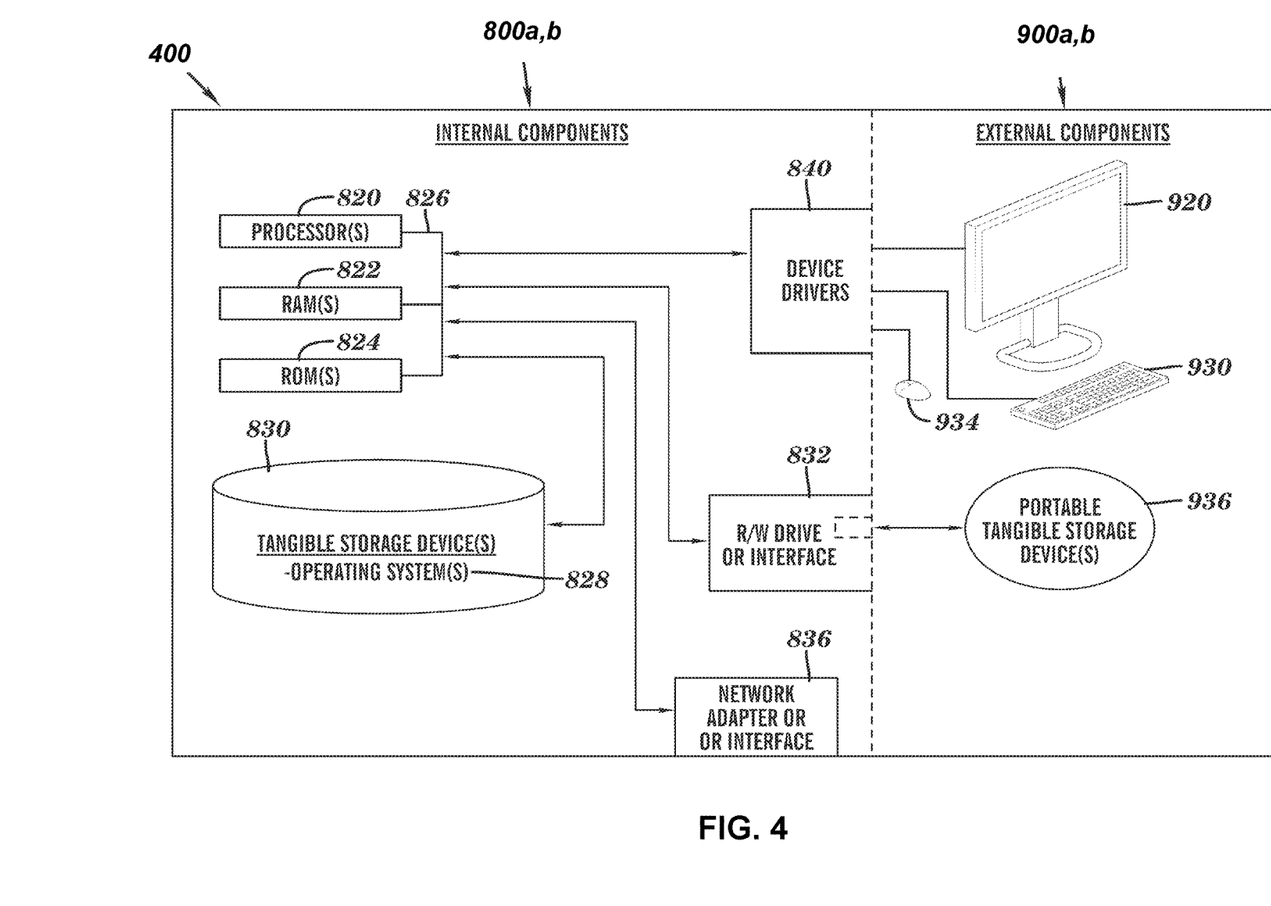
FIG. 4 is a block diagram of internal and external components of computers and servers depicted in FIG. 1 according to one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800a, b and external components 900a, b illustrated in FIG. 4. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and Target Device Collocator Program 108A (FIG. 1) in client computer 102 (FIG. 1) and Target Device Collocator Program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as Target Device Collocator Program 108A (FIG. 1) and 108B (FIG. 1), can be stored on one or more of the respective portable computer-readable tangible storage devices 936, read via the respective R/W drive or interface 832 and loaded into the respective hard drive 830.

Each set of internal components 800a, b also includes network adapters or interfaces 836 such as a TCP/IP adapter cards, wireless Wi-Fi interface cards, or 3G or 4G wireless interface cards or other wired or wireless communication links. The Target Device Collocator Program 108A (FIG. 1) in client computer 102 (FIG. 1) and Target Device Collocator Program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the Target Device Collocator Program 108A (FIG. 1) in client computer 102 (FIG. 1) and the Target Device Collocator Program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to determine whether a target device is collocated with at least one other device within a plurality of devices associated with a user's contact list stored on the user's device, the method comprising:
   determining location information for each of the plurality of devices associated with the user's contact list, wherein the location information comprises movement vectors;
   selecting the target device within the plurality of devices associated with the user's contact list;
   determining, based on the location information, whether the selected target device is collocated with the at least one other device within the plurality of devices associated with the user's contact list, wherein the determining comprises comparing movement vectors for the selected target device and the at least one other device;
   displaying the at least one other device to the user;
   determining if the at least one other device is selected by the user; and
   connecting the target device and the selected at least one other device to the user's device based on the determining indicating that the at least one other device is selected.

2. The method of claim 1, wherein connecting the target device and the selected at least one other device to the user's device comprises the use of an existing short range technology.

3. The method of claim 2, wherein the existing short range technology comprises at least one of Bluetooth communication or Wi-Fi communication.

4. The method of claim 1, wherein the determining location information for each of the plurality of devices associated with the user's contact list comprises querying a coordinating server, and wherein the location information comprises how recently a location was identified.

5. The method of claim 1, wherein the connecting the target device and the selected at least one other device to the user's device comprises displaying an updated list of collocated users as the collocated users are no longer present or collocated near the selected target device.

6. The method of claim 1, wherein the displaying the at least one other device to the user comprises displaying a contact person name adjacent to a plurality of contact information associated with the at least one other device.

7. The method of claim 6, wherein the displaying the at least one other device to the user comprises a plurality of non-collocated devices not being displayed.

8. A computer system to determine whether a target device is collocated with at least one other device stored in a user's contact list, the computer system comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

determining location information for each of the plurality of devices associated with the user's contact list, wherein the location information comprises movement vectors;

selecting the target device within the plurality of devices associated with the user's contact list;

determining, based on the location information, whether the selected target device is collocated with the at least one other device within the plurality of devices associated with the user's contact list, wherein the determining comprises comparing movement vectors for the selected target device and the at least one other device;

displaying the at least one other device to the user;

determining if the at least one other device is selected by the user; and connecting the target device and the selected at least one other device to the user's device based on the determining indicating that the at least one other device is selected.

9. The computer system of claim 8, wherein connecting the target device and the selected at least one other device to the user's device comprises the use of an existing short range technology.

10. The computer system of claim 9, wherein the existing short range technology comprises at least one of Bluetooth communication or Wi-Fi communication.

11. The computer system of claim 8, wherein determining location information for each of the plurality of devices associated with the user's contact list comprises querying a coordinating server, and wherein the location information comprises how recently a location was identified.

12. The computer system of claim 8, wherein the connecting the target device and the selected at least one other device to the user's device comprises displaying an updated list of collocated users as the collocated users are no longer present or collocated near the selected target device.

13. The computer system of claim 8, wherein the displaying the at least one other device to the user comprises displaying a contact person name adjacent to a plurality of contact information associated with the at least one other device.

14. The computer system of claim 13, wherein the displaying the at least one other device to the user comprises a plurality of non-collocated devices not being displayed.

15. A computer program product to determine whether a target device is collocated with at least one other device stored in a user's contact list, the computer program product comprising:

one or more computer-readable tangible storage medium and program instructions stored on at least one of the one or more tangible storage medium, the program instructions executable by a processor, the program instructions comprising:

program instructions to determine location information for each of the plurality of devices associated with the user's contact list, wherein the location information comprises movement vectors;

program instructions to select the target device within the plurality of devices associated with the user's contact list;

program instructions to determine, based on the location information, whether the selected target device is collocated with the at least one other device within the plurality of devices associated with the user's contact list, wherein the determining comprises comparing movement vectors for the selected target device and the at least one other device;

program instructions to display the at least one other device to the user;

program instructions to determine if the at least one other device is selected by the user; and program instructions to connect the target device and the selected at least one other device to the user's device based on the determining indicating that the at least one other device is selected.

16. The computer program product method of claim 15, wherein connecting the target device and the selected at least one other device to the user's device comprises the use of an existing short range technology.

17. The computer program product of claim 15, wherein the determining location information for each of the plurality of devices associated with the user's contact list comprises querying a coordinating server, and wherein the location information comprises how recently a location was identified.

18. The computer program product of claim 15, wherein the connecting the target device and the selected at least one other device to the user's device comprises displaying an updated list of collocated users as the collocated users are no longer present or collocated near the selected target device.

19. The computer program product of claim 15, wherein the displaying the at least one other device to the user comprises displaying a contact person name adjacent to a plurality of contact information associated with the at least one other device.

20. The computer program product of claim 19, wherein the displaying the at least one other device to the user comprises a plurality of non-collocated devices not being displayed.

* * * * *